Oct. 4, 1927.
G. C. THOMAS, JR
1,644,296
CABLE CONNECTER
Filed Jan. 22, 1924
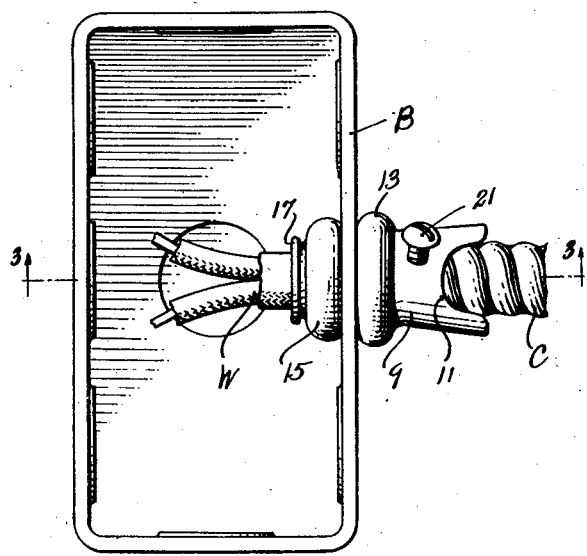
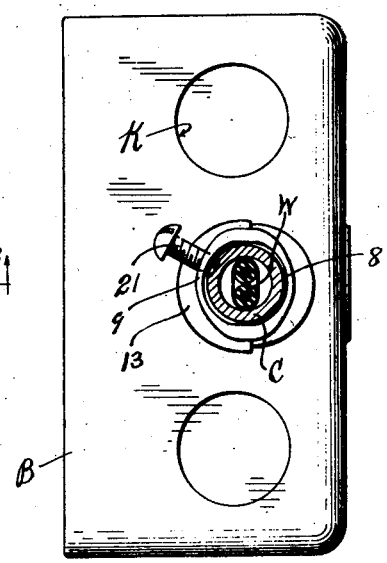
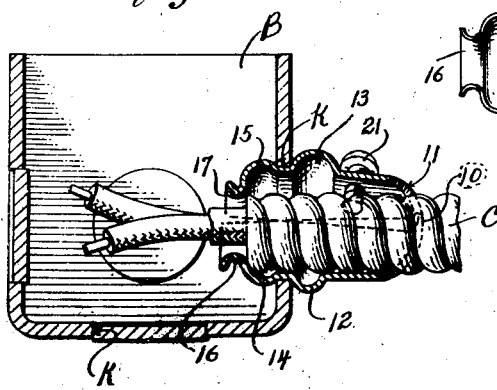
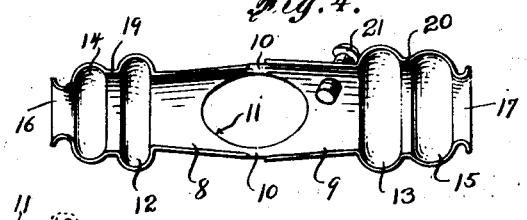
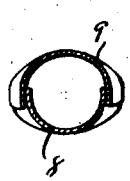
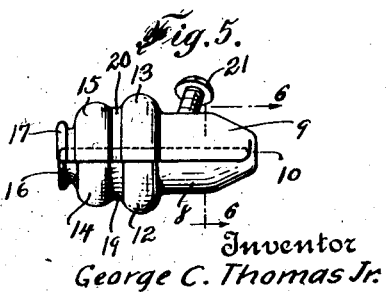
Inventor
George C. Thomas Jr.
By Attorneys Patented Oct. 4, 1927.

1,644,296

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,784.

This invention relates to cable connecters for use in anchoring cables or conduits to electric fixture boxes, such as outlet boxes, switch boxes, and the like.

An object of the invention is to produce improved cable connecters of simple structure capable of being economically manufactured as by stamping the said device from sheet material. Likewise it is an object to produce a cable connecter which positively functions to anchor cable or conduit to a box, as well as produce a cable connecter which fits standard boxes of present-day use having round knock-out holes; and a feature of my improved connecter resides in the fact that it consists of little material and it can be manufactured by a single stamping operation.

A further purpose is to produce a connecter made of a single piece of sheet material or flat blank having a cable receiving hole centrally formed therein and defined by a ring-like sleeve end, the ring-like end itself including necks or strips serving to integrally connect together at one end two expandible sleeve portions leaving the other ends expandibly free; and a screw is threaded through the wall of the connecter which acts to grip against a cable in the sleeve and simultaneously expand the sleeve to anchor it in a box hole.

The accompanying drawings illustrate one practical embodiment of the invention, the construction of which may be varied or modified in certain respects without departing from the scope or principle of the invention.

Figure 1 illustrates a plan view of the cable connecter shown assembled with a box and cable; and Figure 2 is an end projection thereof.

Figure 3 illustrates a sectional view on the line 3—3 of Figure 1, and shows how the connecter expands in the box by spreading apart at one end thereof.

Figure 4 illustrates an inside unfolded view of the cable connecter struck or punched from sheet metal; and Figure 5 shows a view thereof folded up and forming a finished article.

Figure 6 illustrates a cross sectional view on the line 6—6 of Figure 5.

Referring now more particularly to the drawings for a detailed description of the invention, there is shown a sheet metal stamping composed primarily of two half sections 8 and 9 integrally joined by a neck or narrow strip of stock 10; and an oblong or elliptic hole 11 is cut or punched through the stamping thereby forming the aforesaid connecting strips 10. The said hole 11 is designed as a cable receiving opening, and its minor axis is preferably equal or substantially equal to the diameter of the cable to be inserted, while the major axis of the said elliptic opening 11 may be sufficiently long as to cause the said opening to reach forward deeply into the body sections 8 and 9, thereby in effect causing the said opening 11 to assume a substantially round or circular form after the stamping has been folded over to that position shown in Figure 5. By viewing the end of the connecter, as in Figure 2, it is observed how the originally elliptic hole presents a substantially round or circular form for the reception of the cable C. The design and structure of the cable receiving opening 11 is such that it is elliptic or oblong until the stamping is folded along the plane of the connecting stock portions 10 whereupon the said opening 11 assumes the round form. Such design and structural arrangements afford a cable opening 11 of such capacity that, when a cable is inserted, said cable fits quite snugly into the opening 11 thus avoiding shaking or vibration which might otherwise cause the cable to become loose in its connecter.

The stamped ends or sections 8 and 9 may be tapered somewhat from the connecting stock ring like portions 10 toward each end thereof; and a certain advantage in the fit of the cable into the connecter is thereby acquired due to the fact that the inner end of the connecter preferably has an internal diameter substantially near that of the external diameter of the cable which it is intended to receive, and since the diameter of the device at the cable receiving end is somewhat greater than the size of the cable C, it follows that the formed up sleeve element 8—9 may taper from the hole 11 towards the other end thereof to bring the connecter sleeve nearer to the cable size.

The two parts 8 and 9 are made with an expanded ring or shouldering means in the form of a swelled out semi-circular ring 12 on one end section and similarly formed into a semi-circular ring 13 which is formed on the other section and which is preferably made somewhat larger in diameter as well as having a greater ring radius than that of the ring 12. In other words the ring 13 is somewhat larger than the ring 12 thereby permitting the smaller to fold down into the larger. Adjacent to the interfitting shouldering ring 12—13, there is formed similar end shoulder rings 14—15, the ring 14 being smaller both as to ring circumference and radius than the shouldering ring 15 to cause them to interfit one in the other. It is desired to form up the two end semi-rings 12 and 14 with smaller radius and diameter than the companion portions 13 and 15 in order that the parts interfit thereby receiving one stamped end into the other such as for example as shown in Figure 6 where the folded over stamped sections overlap causing the smaller tapered end to move into position within the larger stamping. The gradually diminishing diameter of the end section 8 is uniformly smaller than the diminishing diameter of the section 9 thereby causing the two parts 8 and 9 to fit one into the other when the said stamping is folded along the plane of the connecting strips 10.

A bushing end 16—17 is made at the end of each section and one semi-circular bushing part 16 is made smaller in diameter and radius than the other part 17 in order that the said bushing ends may telescope or interfit one into the other in a manner as already described for the body parts. The diameter of the bushing 16—17 is substantially less than the diameter of the armored cable C, and therefore acts as a stop or a rest against which the cable end rests. The outwardly flared or curved structure of the semi-circular bushing ends 16 and 17 affords a smooth surface through which the wires W of the cable may be pulled or manipulated while electrical connections are made in the fixture box B.

In order to provide connector box hole edge anchorage means, a circular seat groove 19—20 is formed between the expanded shoulder rings, the seat 19 being smaller in diameter than that of the seat 20 in order that these parts may also interfit when the flat stamping of Figure 4 is folded together to produce the finished product of Figure 5. The box hole edge seat 19—20 is designed as a knock-out anchorage seat or groove which expands outwardly against the hole edge of the box B after the connector has been introduced and the expanding or operating means manipulated. The diameter of the groove 19—20 is somewhat less than that of the knock-out hole in the box B when the stamping 8—9 is first folded and pressed together, and this is due to the fact that the parts interfit or collapse deeply into each other until the diameter of the interfitting shoulder rings 14—15 is substantially smaller than that of the box knock-out K. The diameter of the shoulder ring 14—15 necessarily must be less than the knock-out K in order that the connector be inserted in the box to bring the ring 14—15 within the inside of the box wall.

Connecter operating means in the form of a clamp screw 21 is threaded through one of the sections and is made to bear with considerable pressure against the armored wall of the cable, either bearing directly thereon or tangentially thereagainst which causes the folded parts 8 and 9 to move apart one from the other at the free ends, thus expanding the connecter until the diameter of the combination shoulder ring 14—15 is noticeably larger than the diameter of the knock-out hole K, and when this position of the parts is reached, the connecter cannot be moved in or out for it is now locked or anchored in position by virtue of the said internal shoulder ring 14—15 together with the external shoulder ring 12—13 establishing respective internal and external bearing seats against the inner and outer surface of the box. The screw 21 is screwed down sufficiently far until the groove 19—20 is expanded and firmly established against the box edge knock-out opening K.

In using the connecter, the device is pressed together or contracted one section into the other as closely together as they will fit, whereupon the cable C is inserted through the sleeve ring-like opening 11 and brought to rest against the bushing 16—17 with the wires W drawn through the bushing. The connecter and cable are now inserted in the box opening K and the screw 21 is turned down until both the cable and the connecter are firmly seated in locked position as shown in the assembled views. It is to be observed that the clamp screw 21 performs the double purpose of expanding outwardly the free ends of the stamped sections 8 and 9, causing them to bend or pivot around the strips 10, thereby forcing the connecter to firmly anchor the box against hole edge K as well as simultaneously grip the cable to the connecter.

The interfitting sections 8 and 9 close one within the other with interfitting or overlapping longitudinal edges which maintains a substantially sealed connecter sleeve on the outside of the box B despite the expanding or separating action of the sleeve sections. The overlapped longitudinal edges prevent existance of a slit or lengthwise crack which would otherwise occur when the sleeve expands to anchor itself in the box.

The device is inexpensive to manufacture and it possesses a minimum amount of material as well as being very light in weight, and all these factors contribute generally to the manufacture of an inexpensive cable connecter.

What I claim is:

1. In combination, a cable box and connecter comprising a box having a connecter and cable receiving opening, a stamping having a central hole punched therein which provides an open end in the connecter after the stamping is fashioned into form to fit into the box opening, a narrow strip of ring-like stock remaining a part of the stamping centrally thereof and defining the aforesaid open end of the connecter and affording a folding axis around which the stamping is bent to bring the ends into juxtaposition, connecter anchorage means on the connecter inserted within the box opening, and means to expand the connecter within the box opening and simultaneously grip a cable.

2. In combination, a cable box and connecter comprising a box having a connecter and cable receiving opening, a stamping having a central hole punched therein to form one open end of a sleeve after the stamping is fashioned into semi-circular sleeve parts, narrow strips of stock remaining a part of the stamping centrally thereof and defining the aforesaid open sleeve end and affording a folding axis around which the stamping is bent to bring the ends into juxtaposition, connecter anchorage means made on the sleeve parts inserted within the box opening, and a screw threaded through one of the folded semi-circular ends of the stamping to grip against a cable and simultaneously expand the anchorage means within the box opening.

3. A connecter comprising a flat stamping bent upon itself to bring the ends together to form a connecter one end of which is expandible and fashioned to fit into a box hole, including box hole anchorage means on the expandible connecter end, said connecter including a cable receiving hole in the other end, flexing strip portions at the hole which makes the connecter non-expansible at one end, and means mounted on the connecter to grip a cable and expand the ends.

4. A connecter comprising a flat stamping bent centrally to bring the ends together to form a connecter with free expandible ends which are fashioned to fit into a box hole, including box hole anchorage means on the expandible connecter end, said connecter including a cable receiving hole in the other end, flexing strip portions at the hole which makes the connecter non-expandible at one end, and a screw threaded through one of the connecter ends to grip a cable received between said connecter ends and to simultaneously force apart the expandible ends.

5. A connecter comprising a stamping including a ring-like portion which joins together the ends thereof made semi-circular to fit a box hole, the semi-circular ends being bent together to form a sleeve with free ends and integrally connected ends, and said ring-like portion defines a cable receiving hole at said integrally connected end, box hole edge anchorage means made in the free ends of the sleeve, and means to grip a cable and simultaneously expand the free ends of the sleeve to render effective said anchorage means.

6. A connecter comprising a stamping including a ring-like portion which joins together the ends thereof made semi-circular to fit a box hole, the semi-circular ends being bent together to form a sleeve with free ends and integrally connected ends, and said ring-like portion defines a cable receiving hole at said integrally connected end, box hole edge anchorage means made in the free ends of the sleeve, and a screw threaded through the connecter sleeve to grip a cable therein and to expand the free ends.

7. A connecter comprising, a flat stamping including two outstanding parts fashioned into semi-circular sleeve halves bent together to produce a sleeve, said outstanding sleeve parts including but being separated by a ring-like portion defining an open sleeve end, box hole edge anchorage means on the sleeve connecter, and a screw threaded through the connecter to grip a cable therein and expand the sleeve.

8. A cable connecter formed from a stamping, said stamping being punched centrally thereof to provide a cable receiving hole, a narrow strip of stock defining the hole and serving to connect the ends of stamping as well as afford a bending axis along which said ends made half-cylindrical are folded to bring them into juxtaposition, a pair of mating shoulder rings expanded on the juxtaposed ends, a contracted box hole edge anchorage groove made between the shoulder rings, and means to simultaneously expand the connecter and anchor a cable therein.

9. A cable connecter formed from a stamping, said stamping being punched centrally thereof to provide a cable receiving hole, a narrow strip of stock bounding the hole and serving to connect the ends of the stamping made half-cylindrical as well as afford a bending axis along which said ends are folded to bring them into juxtaposition, one end of the stamping made narrower than the other end thereby causing the said ends to interfit by receiving the smaller into the larger in a longitudinally overlapping manner, a pair of mating shoulder rings expanded on the juxtaposed ends, a contracted groove made between the shoulder rings and means for simultaneously expanding the connecter and anchoring a cable therein.

10. A cable connecter formed of a stamped piece made half-cylindrical which is centrally pierced providing a cable receiving hole, said stamping made substantially wide in the center thereof around the hole and tapered toward the ends, one tapered portion made wider than the other thus producing interfitting parts by folding over the ends, adjacent shoulder rings made on the folded interfitting portions, a groove formed between the shoulder rings, and means to expand said interfitting ends, and simultaneously secure a cable in the connecter.

11. A cable connecter comprising a half-cylindrical stamping centrally perforated to make a cable receiving hole, a series of semi-circular rings formed on each end of the stamping, said rings designed to cooperate and form substantially round shouldering means adapted to fit against the internal and external surface of a cable box, a grooved seat made between the said shouldering means, said seat being made smaller in diameter than the diameter of the adjacent shouldering means, means for expanding the grooved seat for anchoring the connecter in a box and for simultaneously securing a cable in the connecter, and one of the said rings made less in diameter than a cable diameter and acting as a bushing.

12. In combination, a cable box and connecter comprising a box having a cable opening to receive cable, a half-cylindrical stamping carrying a central hole punched therein providing a cable opening after the stamping is formed up, narrow strips of stock remaining a part of the stamping centrally thereof affording a folding axis around which the stamping is bent to bring the ends into juxtaposition, adjacent shoulder rings made on each end of the stamping and inserted within the box opening, a groove made between the rings and acting as a seat for the box edge, and means adapted to expand the shoulder rings and groove within the box opening and for simultaneously anchoring cable in the folded stamping.

13. A cable connecter formed up of a single piece stamping, said stamping being half-cylindrical punched centrally thereof to provide a cable receiving hole, a strip of stock bounding the hole and serving to connect the ends of the stamping as well as afford a bending axis along which said ends are folded to bring them into juxtaposition, a pair of mating shoulder rings expanded on the juxtaposed ends, a contracted groove made between the shoulder rings, and cable clamping means carried by the stamping which simultaneously expands the free ends of the connecter and anchors a cable thereto.

14. A cable connecter comprising a stamping punched centrally thereof to provide a cable receiving hole, connecting strips of stock serving to connect the ends of stamping made half-cylindrical as well as afford a bending axis along which said ends are folded to bring them into juxtaposition, one end of the stamping made narrower than the other end thereby causing the said ends to interfit by receiving the smaller into the larger, a pair of mating shoulder rings expanded on the juxtaposed ends, a contracted groove made between the shoulder rings, and a clamp screw carried by the stamping.

15. A cable connecter formed of a stamped piece made half-cylindrical which is centrally pierced providing a cable receiving hole, said stamping made substantially wide in the center thereof around the hole and tapered toward the ends, bending strips formed at the hole, one tapered portion made wider than the other thus producing interfitting parts by folding together the ends, adjacent shoulder rings made on the folded interfitting portions by which the connecter is attached to a box, a groove formed between the shoulder rings, means to expand one end of the connecter, and a bushing made on the inner end of the connecter.

16. A cable connecter comprising a sheet metal part centrally perforated to provide a cable receiving opening, said stamping being semi-circular in cross-section, bending strips formed at the hole which permits the part to be folded centrally to form a full cylindrical sleeve, a semi-circular ring bushing made on each end forming a full circular bushing disposed in alignment with the cable opening, and a clamp screw threaded through the connecter to force the free ends of the connecter away from each other to expand the connecter.

17. A cable sleeve connecter fashioned from a sheet metal stamping comprising, a stamping provided with a hole punched therein defining one end of the finished sleeve, a pair of sleeve plates embodied in the stamping and pressed into half-cylindrical parts, bendable strips of narrow stamped stock serving to connect the half-cylindrical parts, said parts being folded together along the bendable strips as an axis to complete the sleeve, connecter anchorage means made on the sleeve by which it attaches to a box, and means mounted on the sleeve to clamp a cable therein and simultaneously expand the sleeve parts by separation and bending operation at the narrow strips to render effective the aforesaid connecter anchorage means.

18. A cable sleeve connecter as defined in claim 17 further characterized and distinguished by adapting the said punched hole as a cable receiving opening at one end of the sleeve, and characterized by making the connecter anchorage means a pressed groove formed in one end of each half-cylindrical part which produces a complete circular seat adapted to expand against the rim of a box hole.

19. A cable connecter fashioned from a sheet metal blank comprising, a stamping with a hole punched centrally therein, said stamping adjacent the hole being pressed into semi-cylindrical parts which are folded together along a bending axis adjacent the hole to bring the parts together to form a sleeve with said hole forming one sleeve end and the free extremities of the parts forming the other sleeve end, a pair of oppositely disposed connecting strips forming the aforesaid bending axis and serving to hold the parts together at the aforesaid punched hole, connecter anchorage means made on the sleeve by which it attaches itself to and within a box opening, and means mounted in the sleeve adapted to clamp a cable therein and simultaneously expand the parts by separation and bending operation at the aforesaid connecting strips to render effective the aforesaid connecter anchorage means.

20. A cable connecter as defined in claim 19 further distinguished by a circular seat groove in the stamping at each end furthest from the hole thus forming connecter anchorage means, a bushing ring end formed on the extremity of the sleeve adjacent the seat groove, and said bushing ring end performing the double function of a stop against which the armored cable end comes to rest in the sleeve and through which the insulated wires are protectively guided.

21. A connecter comprising; a stamping, including a cable receiving hole punched between its ends which defines one end of the connecter, bending necks included about the cable hole to permit the stamping ends to be folded together, and said bending necks being disposed in opposite relation to each other at the hole and connecter end; box hole edge anchorage means by which the connecter engages a box hole; and operating means to grip a cable and render effective the anchorage means.

22. A connecter comprising; a stamping, including a cable receiving hole punched between its ends which defines one end of the connecter, bending necks included about the cable hole to permit the stamping ends to be folded together; anchorage means included on one of the stamping ends to anchor against a box hole edge; and operating means carried on the same stamping end which carries the anchorage means.

In testimony whereof I affix my signature.

GEORGE C. THOMAS, Jr.